United States Patent [19]
Koike

[11] Patent Number: 4,781,099
[45] Date of Patent: Nov. 1, 1988

[54] MUSICAL QUIZ APPARATUS

[75] Inventor: Tatsuhiro Koike, Hamakita, Japan

[73] Assignee: Nippon Gakki Seizo Kabushiki Kaisha, Hamamatsu, Japan

[21] Appl. No.: 439,290

[22] Filed: Nov. 4, 1982

[30] Foreign Application Priority Data

Nov. 10, 1981 [JP] Japan .................. 56-167210

[51] Int. Cl.$^4$ ............................................ G09B 15/00
[52] U.S. Cl. ........................................ 84/470 R; 84/478
[58] Field of Search ............... 84/454, 470 R, 477 R, 84/478, 1.01, 1.03, DIG. 22

[56] References Cited

U.S. PATENT DOCUMENTS

| 4,031,797 | 6/1977 | Schmoyer | 84/470 R |
| 4,306,481 | 12/1981 | Bione | 84/1.03 |
| 4,416,182 | 11/1983 | Wise et al. | 84/470 R |

FOREIGN PATENT DOCUMENTS 2035664  6/1980  United Kingdom ............ 84/470 R

Primary Examiner—A. D. Pellinen
Assistant Examiner—Todd E. DeBoer
Attorney, Agent, or Firm—Spensley Horn Jubas & Lubitz

[57] ABSTRACT

A musical quiz apparatus presents a question chord in sound and a trainee answers by depressing the keys of the chord constituting notes on the keyboard. The apparatus is capable of generating a plurality of different chord data respectively representing chords, and generates a question chord datum one at a time as randomly selected from among those different chord data and produces sounds of notes which constitutes a chord designated by the question chord data. When the answer is correct, points are added up and a next question chord is presented.

4 Claims, 9 Drawing Sheets

| TONALITY \ NOTE DEGREE | TONIC NOTE (0) | SUB DOMINANT NOTE (5) | DOMINANT NOTE (7) |
|---|---|---|---|
| KEY OF C (8) | ROOT = $C_3$(8) | ROOT = $F_3$(13) | ROOT = $G_3$(15) |
| KEY OF F (1) | ROOT = $F_2$(1) | ROOT = $A^\#_2$(6) | ROOT = $C_3$(8) |
| KEY OF G (3) | ROOT = $G_2$(3) | ROOT = $C_3$(8) | ROOT = $D_3$(10) |

FIG. 4

| TON-ALITY | ROOT NOTE DE-GREE | ROOT NOTE (0) | 2ND LOCATION NOTE (+3) (4) | 3RD LOCATION NOTE (+5) (7) |
|---|---|---|---|---|
| C: (8) | TONIC(0) | ROOT=C$_3$(8) | 3RD DEGREE= E$_3$(12) | 5TH DEGREE= G$_3$(15) |
| | SUB DOMINANT(5) | ROOT=F$_3$(13) | 3RD DEGREE= A$_3$(17) | 5TH DEGREE= C$_4$(20) |
| | DOMINANT(7) | ROOT=G$_3$(15) | 3RD DEGREE= B$_3$(19) | 5TH DEGREE= D$_4$(22) |
| F: (1) | TONIC(0) | ROOT=F$_2$(1) | 3RD DEGREE= A$_2$(5) | 5TH DEGREE= C$_3$(8) |
| | SUB DOMINANT(5) | ROOT=A$^\#_2$(6) | 3RD DEGREE= D$_3$(10) | 5TH DEGREE= F$_3$(13) |
| G: (3) | TONIC(0) | ROOT=G$_2$(3) | 3RD DEGREE= B$_2$(7) | 5TH DEGREE= D$_3$(10) |
| | DOMINANT(7) | ROOT=D$_3$(10) | 3RD DEGREE= F$^\#_3$(14) | 5TH DEGREE= A$_3$(17) |

*FIG. 5*

| TON-ALITY | CHORD DEGREE | ROOT POSITION (0,0,0) | 1ST INVERSION (12, 0, 0) | 2ND INVERSION (12, 12, 0) |
|---|---|---|---|---|
| C:(8) | TONIC CHORD | $C_3(8), E_3(12), G_3(15)$ | $C_4(20), E_3(12), G_3(15)$ | $C_4(20), E_4(24), G_3(15)$ |
| | SUB DOMINANT CHORD | $F_3(13), A_3(17), C_4(20)$ | $F_4(25), A_3(17), C_4(20)$ | $F_4(25), A_4(29), C_4(20)$ |
| | DOMINANT CHORD | $G_3(15), B_3(19), D_4(22)$ | $G_4(27), B_3(19), D_4(22)$ | $G_4(27), B_4(31), D_4(22)$ |
| F:(1) | TONIC CHORD | $F_2(1), A_2(5), C_3(8)$ | $F_3(13), A_2(5), C_3(8)$ | $F_3(13), A_3(17), C_3(8)$ |
| | SUB DOMINANT CHORD | $A^\#_2(6), D_3(10), F_3(13)$ | $A^\#_3(18), D_3(10), F_3(13)$ | $A^\#_3(18), D_4(22), F_3(13)$ |
| G:(3) | TONIC CHORD | $G_2(3), B_2(7), D_3(10)$ | $G_3(15), B_2(7), D_3(10)$ | $G_3(15), B_3(19), D_3(10)$ |
| | DOMINANT CHORD | $D_3(10), F^\#_3(14), A_3(17)$ | $D_4(22), F^\#_3(14), A_3(17)$ | $D_4(22), F^\#_4(26), A_3(17)$ |

FIG. 6

MUSICAL QUIZ APPARATUS

BACKGROUND OF THE INVENTION (a) Field of the Invention:

The present invention pertains to a musical quiz apparatus for use in, for example, performing sound-dictation training in the place where musical education is provided, and more particularly it relates to a musical quiz apparatus having the functions of presenting as well as answering chord quizes.

(b) Description of the Prior Art:

As well known, sound-dictation training has been conducted widely in places of musical education. In the past, the sound-dictation training has been carried out in such pattern that the teacher presents, as a question, arbitrary sounds by utilizing, for example, a piano or an organ, and that he asks the pupils to answer the question by, for example, orally or writing the musical notes on a music score sheet, and that then the teacher gives marks (points) on the answers collected from the pupils.

However, such questioning, answering and rating pattern which has been practiced in the past has the fundamental drawbacks that, owing to the fact that the selection of the question (quiz) sounds has been entrusted with the teacher, the selection of the question sounds has tended to become partialized depending on the taste of the individual teachers, and also that, owing to the relatively difficult availability of good tutor in music who can assist a pupil at the latter's home when the pupil intends to do a sound-dictation training by himself, no satisfactory training has been accomplished.

In order to improve such drawbacks in the conventionally practiced sound dictation training method, there has been proposed, in Japanese Patent Preliminary Publication No. Sho 54-51642, an electronic musical instrument arranged to be operative so that numerical data corresponding to question or quiz sounds are generated randomly by utilizing a random number generator, and that these generated numerical data are sounded via a musical sound generating system, and that concurrently therewith numerical data corresponding to the depressed keys on the keyboard are generated, so that owing to the recognition of the presence of coincidence between these two types of numerical data, a self-practice of sound dictation training can be made.

This prior electronic musical instrument has the advantages that the tendency of presenting quiz sounds becomes very random because quiz sounds are generated randomly by utilizing a random number generator, bringing about a remarkable improvement of the result or effect of training of this type, and also that, in such environment as in general households where there is no teacher who gives a lesson, it is possible to conduct a sound dictation training of said type with a good efficiency by the pupil himself.

On the other hand, in such electronic musical instrument as described just above, the numerical datum which is outputted from the random number generator is one which corresponds only to a single kind of note pitch datum. Accordingly, the sound dictation training which is conducted by relying on this conventional electronic musical instrument is limited always to a single sound at a time, i.e. individual notes of a monophonic melody, and thus this prior training system has the fundamental drawback that it cannot be utilized for the training on chord sounds.

Apart from the above, as an apparatus which allows the pupil to conduct a sound dictation training of this type by himself, and enabling him also to perform a sound dictation training on chords, there is known, for example, the one disclosed in Japanese Patent Preliminary Publication No. Sho 52-101131.

In this latter apparatus, however, arrangement is provided so that numerical data corresponding to question chords are stored in a ROM (Read-Only Memory), and that these data are read out in a certain order. Thus, the tendency of presenting chord questions is fixed and lacks variation. As a result, at the end of several repetitions of training in such pattern, the pupil will have memorized the order of the chords which will be presented, and accordingly there arises the problem that the effect of lesson cannot be enhanced sufficiently.

SUMMARY OF THE INVENTION

It is, therefore, a primary object of the present invention to provide a new musical quiz apparatus having a chord question presenting-and-answering function, which is capable of improving as highly as possible the effect of lessons of chord sound dictation training by generating, in succession chords, one at a time, which is selected randomly from among a plurality of different chords.

Another object of the present invention is to provide an apparatus of the type as described above, which is capable of preliminarily designating the tonality of the chord selected randomly from among a plurality of different chords.

Still another object of the present invention is to provide an apparatus of the type as described above, which is capable of randomly selecting either one of the tonic chord, subdominant chord and dominant chord as a chord in each tonality.

Yet another object of the present invention is to provide an apparatus of the type as described above, which is capable of making random selection of the chord positions from among the root position and inversions of the tonic chord, subdominant chord and dominant chord in each tonality.

A further object of the present invention is to provide an apparatus of the type as described above, which is capable of displaying the points gained on the answer to the question presented.

A still further object of the present invention is to provide an apparatus of the type as described above, which is arranged so that when the answer to any single quiz chord has failed to be correct over a predetermined number of repetition of answer, a correct answer chord is displayed or indicated.

A yet further object of the present invention is to provide an apparatus of the type as described above, which is capable of selectively carrying out, by a single indicating means, the display of the gained numerical mark (points) and the display of the correct answer in numerals.

In order to attain the above-mentioned objects, the present invention provides for an arrangement comprising: a chord datum generating means for randomly selecting one of a plurality of chord data and for generating a quiz chord datum; a musical note forming means for forming musical notes corresponding to said quiz chord datum generated by said chord datum generating means; means for detecting a chord constituted by the notes of depressed keys for outputting a datum of a chord of depressed keys corresponding to the respective depressed keys on the keyboard; judging means for recognizing the coincidence between the question chord datum outputted from said chord datum generating means and the datum of a chord of the depressed keys outputted from said means for detecting a chord of depressed keys, and means for commanding said chord datum generating means to generate a fresh question chord datum.

To begin with, description will be made of the outline of the basic operation of a preferred embodiment of the present invention.

The musical quiz apparatus of this embodiment is provided with a keyboard having 25 keys starting from $F_2$ note up to $F_4$ note. Also, this musical quiz apparatus is provided, at appropriate front sites thereof, with: five (5) key buttons, i.e.: three tonality selection key buttons corresponding to the tonalities of C, F and G, respectively; a start key button for commanding the presentation of a quiz chord; and a power supply key button for turning-on the power supply. Furthermore, at appropriate sites on the front side of the apparatus, there are provided three numerical value indicators for indicating numerical values consisting of two figures, respectively.

Next, in order to start a sound dictation training, the first step is to manipulate the power supply key button to switch-on the apparatus. Then, by selectively manipulating either one of the tonality selection key buttons, the tonality of the chord which is presented as a question is accordingly selectively set to either one of the tonalities C, F and G in this embodiment, while other tonalities can be provided as well according to necessity.

Thereafter, the connection of a sounding system changeover switch which is provided on the operation panel of the apparatus is changed over to either the loudspeaker side or to the headphone side, and then the start key button is operated. Whereupon, a chord in the tonality designated by the operation of the tonality selection key is sounded from either the loudspeaker or the headphones, whereby the presentation of a question chord is performed.

Here, it should be noted that the chord which is presented as a question is either one of the tonic chord, subdominant chord and dominant chord in a specific tonality designated by the tonality selection key, and it is presented in either one of the positional forms, i.e. root position, first inversion and second inversion of one of the abovementioned kinds of chord. More specifically, of all other conditions of the chord which is presented as a question, only the tonality of the question chord is fixed to that specific tonality which has been designated by the tonality selection key. However, it should be noted here that which degree and form the question chord will assume, i.e. whether it is presented in the degree of a tonic chord, a subdominant chord or a dominant chord or in the positional form of a root position, a first inversion or a second inversion, is given utterly randomly with no regularity.

For this reason, it is perfectly impossible to anticipate what kind of chords will be presented after one another as questions. Owing to this lack of probability of anticipation, it is possible to carry out an effective sound dictation training over very many variations of chords.

Then, the pupil recognizes, through his ears, which one of the tonic chord, subdominant chord, dominant chord and which one of their root position, first inversion and second inversion in the designated tonality the question chord is given. And, the pupil depresses the keys on the keyboard which correspond to the result of such dictation of sounds. In case the chord consituted by the depressed keys on the keyboard coincides with the question chord, a next chord is randomly presented as a next question in the same manner as that described just above. Also, in case there is a coincidence between the chord constituted by the depressed keys on the keyboard and the question chord in such manner as described above, a predetermined value is added for each coincidence to the numeral displayed on one of the abovesaid three numerical value indicators as the gained points. Whereby, the result of points obtained by the sound dictation training is displayed by the pertinent numerical value indicator.

On the other hand, in case, after any chord is presented as a question, the state that the chord constituted by the depressed keys on the keyboard fails to coincide with the question chord is repeated a number of times in excess of a predetermined number of times of key depression, there are displayed, on the abovesaid three numerical value indicators, three numerical values indicative of the three keys which constitute the correct answer chord.

In this way, the pupil is now able to learn the correct answer to the question chord, by viewing the numerical values displayed on these three numerical value indicators. In this embodiment, the three numerical value indicators each fulfills the roles of the correct answer displayer and the gained points displayer. In order to avoid misunderstanding the displayed numerals, arrangement is provided so that a correct chord is indicated by three numerical values each consisting of two figures (digits), whereas gained points are indicated by a numerical value constituted by a single figure (less than 10) in a display window.

As discussed above, one of a plurality of kinds of question chords (tonic chord, subdominant chord and dominant chord in their root position, first inversion or second inversion) is randomly presented. Accordingly, it will be noted that, how many questions are presented one after another, it is not possible for the pupil to anticipate the question chord which will be presented the next time. Thus, it becomes possible for the pupil to receive an effective training of very many varieties of chords.

Furthermore, the apparatus allows the pupil to designate at will of this pupil only the tonality of the question chord which is to be presented. Accordingly, the pupil is able to effectively exercise the chords in respective tonalities according to the theory of harmonies. Also, because of the arrangement that enables the means for sounding the question chord to be switched of its connection between the loudspeaker and the headphones, it will be noted that, by switching to set the arrangement so that the sounding is effected through headphones, it will be possible for a number of pupils in a same classroom to carry out individually different answering operations simultaneously for different question chords which are presented by the respective individual apparatuses. Thus, the apparatus of the present invention is very suitable also for use in a group training for a number of pupils.

BRIEF DESCRIPTION OF THE DRAWINGS

FIG. 4 is a schematic representation showing the relationship between the identification values for the tonic chord, subdominant chord and dominant chord in respective tonalities and the numerical values, shown in ( ), for the respective notes on the keyboard.

FIG. 5 is a schematic representation showing the numerical values for the note at +3rd interval and the note at +5th interval respectively in case the tonic note, subdominant note and dominant note in the respective tonalities are the root notes, and also showing the relationship between these respective values and the numerical values, shown in ( ) for these respective notes on the keyboard.

FIG. 6 respectively for the tonic chord, subdominant chord and dominant chord in the respective tonalities, the relationship between sets of values respectively for the root position, the first inversion and the second inversion, the chord-constituting forms actually assumed when presented as a question and the numerical values for the respective chord-constituting notes on the keyboard.

DETAILED DESCRIPTION OF THE PREFERRED EMBODIMENT

Description will hereunder be made, in further detail, of the arrangement and the operation of the musical quiz apparatus representing a preferred embodiment of the present invention.

Figure 1:
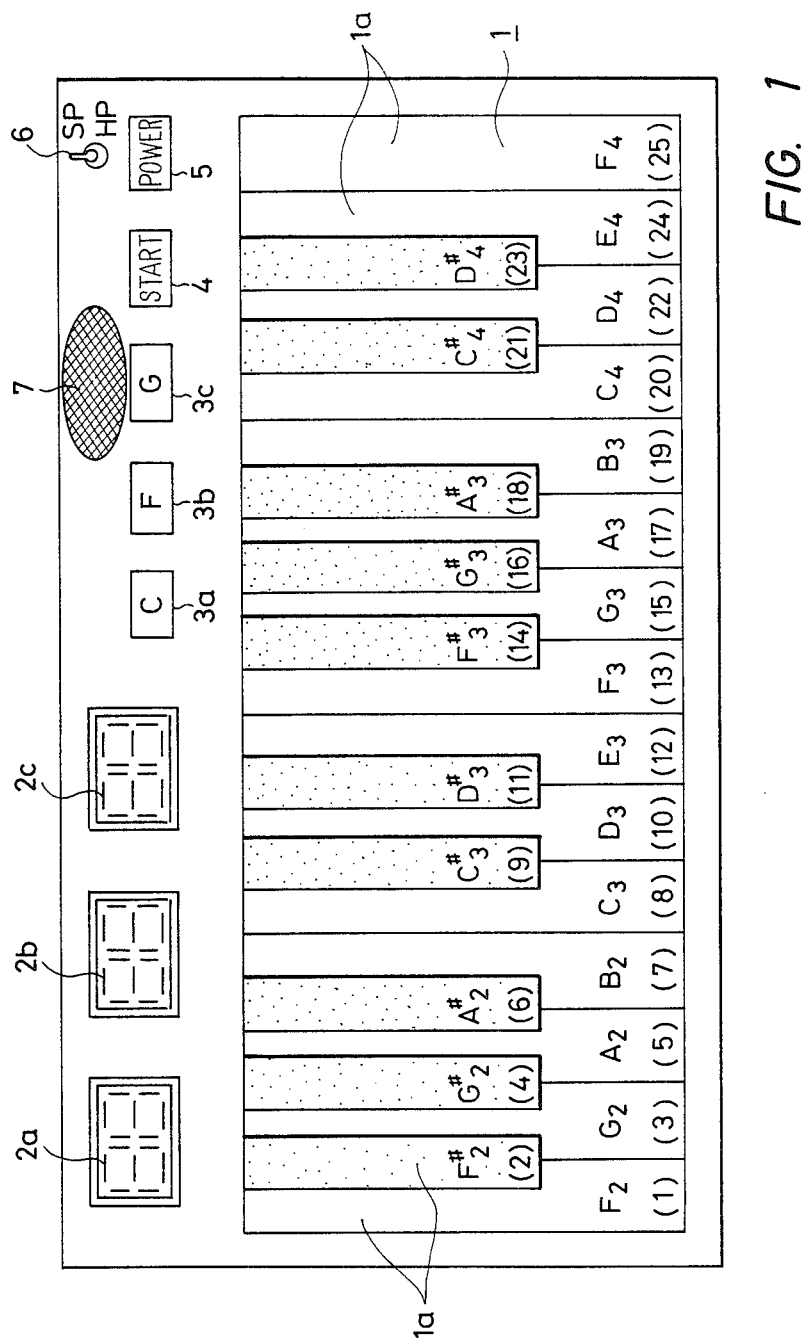
FIG. 1 is a diagrammatic front view showing the arrangement of the manipulating section of the musical quiz apparatus according to the present invention.

The operation panel of the musical quiz apparatus shown in this embodiment is provided, as shown in FIG. 1, with a keyboard comprising twenty-five (25) keys 1 corresponding to $F_2$ note (87.3 Hz)~$F_4$ note (349.2 Hz). These keys correspond to numerical values (1)~(25), respectively, as shown.

On the upper portion of the keyboard is arranged a horizontal array of three numerical value displays 2a, 2b and 2c for displaying decimal numerals consisting of two digits, respectively. On the right side of these numerical value indicators, there are arranged tonality selection keys 3a, 3b and 3c for C, F and G, respectively. On the operation panel, there are arranged, in addition to those keys mentioned above, a start key 4 for commanding the starting of a question-presenting action, a power supply key 5 for switching-on the power supply, a sounding system changeover lever 6 for switching the connection of the sounding system between the loudspeaker and the headphone, and a loudspeaker 7.

Figure 2A:
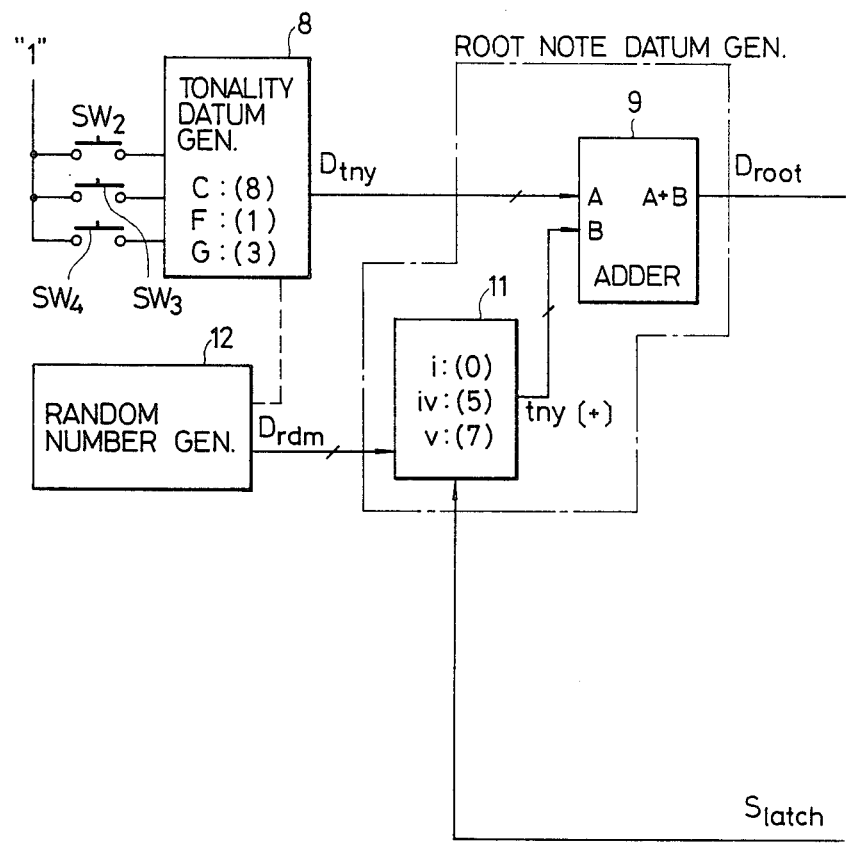
FIGS. 2A, 2B and 2C in combination, a block diagram showing the electric arrangement of the musical quiz apparatus shown in FIG. 1.

On the operation panel shown in FIG. 1, after the power supply key 5 is operated, either one of the tonality selection keys 3a, 3b and 3c is operated. Whereupon, corresponding one of the tonality selection switches $SW_2$, $SW_3$ and $SW_4$ shown in FIG. 2A is turned "on". As a result, a tonality datum generating circuit 8 also shown in FIG. 2A generates a numerical datum (hereinafter to be referred to as tonality datum $D_{tny}$) indicative of a tonality (such as C, F or G) corresponding to the specific switch selected from among $SW_2$ to $SW_4$. Here, the values of the tonality data are preliminarily set so as to become (8), (1) and (3) in correspondence to C, F and G, respectively.

A tonality datum $D_{tny}$ which is outputted from the tonality datum generating circuit 8 is supplied to an input terminal A of an adder circuit 9 for the formation of a root datum $D_{root}$.

Figure 2B:
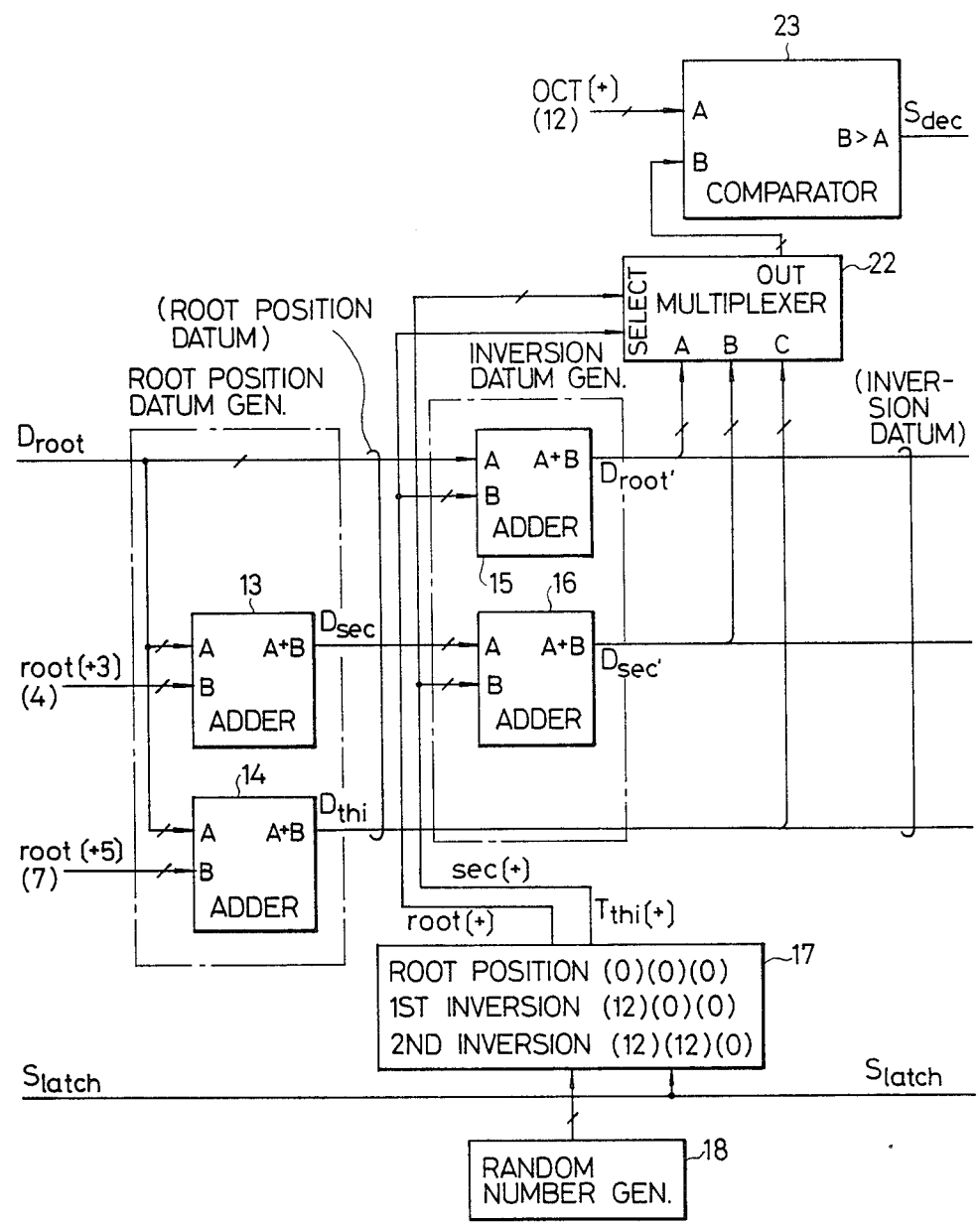
Figure 2C:
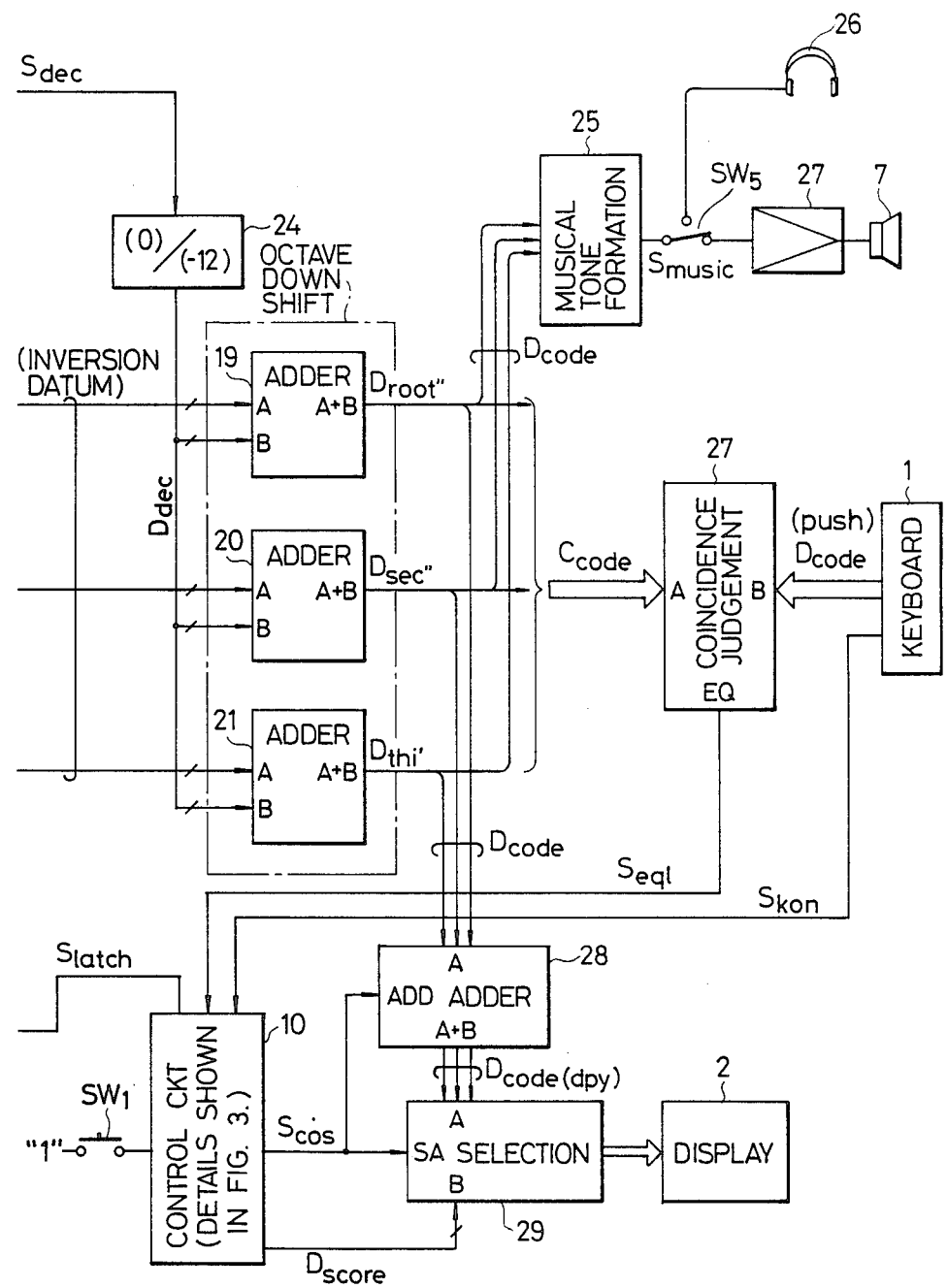
Figure 3:
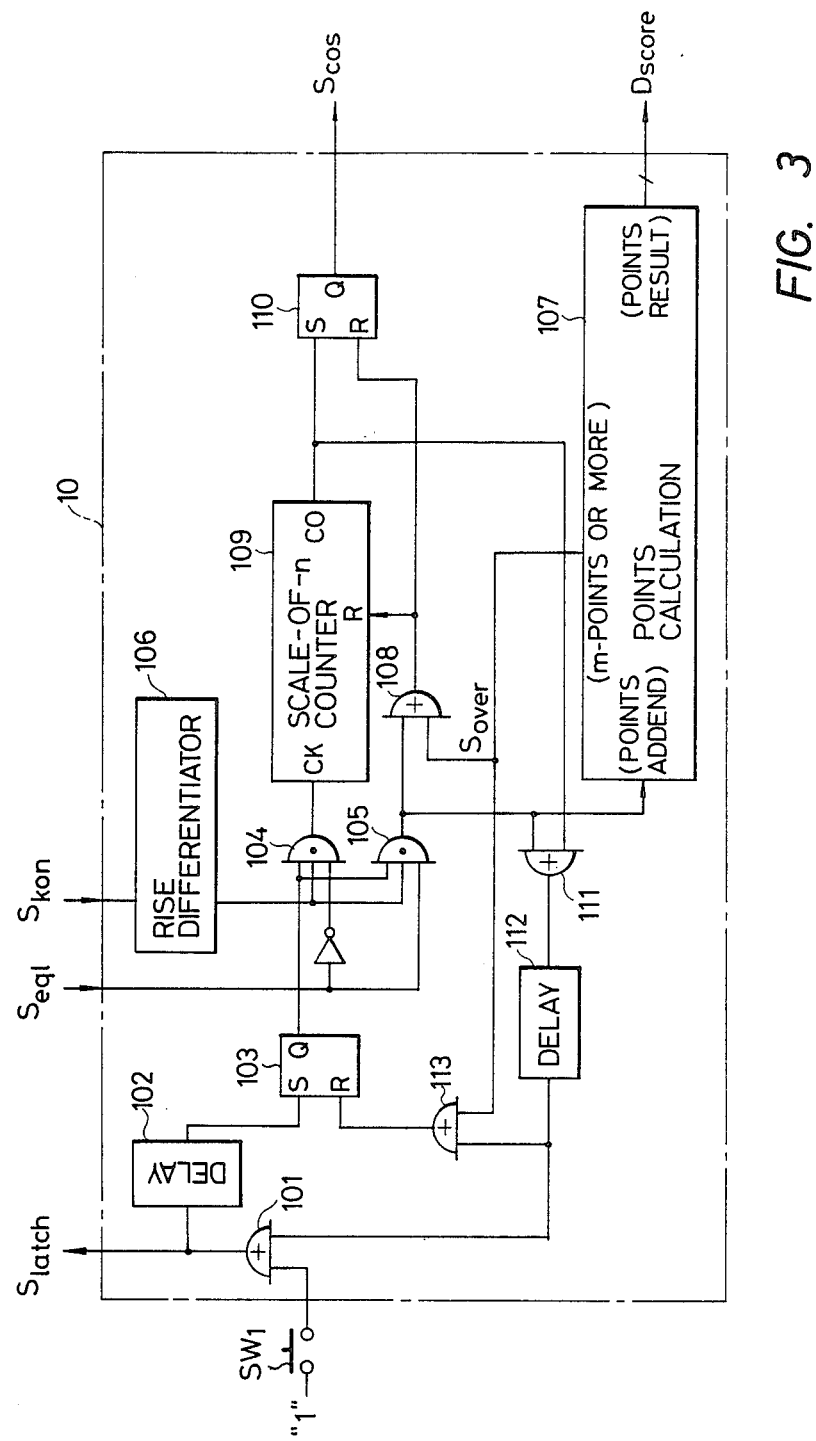
FIG. 3 is a block diagram showing the details of the control circuit contained in the arrangement of FIG. 2C.

When, in this state, the start key shown in FIG. 1 is operated, this causes the start switch $SW_1$ shown in FIG. 2C to be activated. With this activation of the start switch $SW_1$, its output "1" is passed through an OR circuit 101 which is provided within a control circuit 10 as shown in FIGS. 2C and 3, and is supplied as a latching signal $S_{latch}$ to a root designation datum generating circuit 11 shown in FIG. 2A.

The root designation datum generating circuit 11 is intended to determine the root of a question chord to either one of the tonic note "i", subdominant note "iv" and dominant note "v" for the tonality which has previously been set to either one of C, F and G. More specifically, this circuit 11 is comprised of a latch circuit for latching in synchronism with said latch signal $S_{latch}$ a random numerical value datum $D_{rdm}$ outputted from a random number generator 12, and a numerical value datum generating circuit which, in correspondence to the output from this latch circuit, generates a numerical value datum (hereinafter to be referred to as a root designation datum "tny [+]") corresponding to either one of the tonic note "i", subdominant note "iv" and dominant note "v". Here, the value of the root designation datum "tny [+]" is set so as to become (0), (5) and (7) in correspondence to the tonic note "i", subdominant note "iv" and dominant note "v", respectively.

And, the root designation datum "tny [+]" which is outputted from the root designation datum generating circuit 11 is supplied to an input terminal B of the adder circuit 9.

As a result, at the output terminals A+B of the adder circuit 9, there is outputted a numerical datum (hereinafter to be referred to as a root datum $D_{root}$) corresponding to the result of addition of the tonality datum $D_{tny}$ and the root designation datum "tny [+]". Here, the relationship between the tonality datum $D_{tny}$ (tonality) plus the root designation datum "tny [+]" (note degree) and the root datum $D_{root}$ (root) is shown in FIG. 4. As shown therein, in the state wherein, for example, a tonality datum $D_{tny}$ (8) corresponding to key of C is outputted from the tonality datum generating circuit 8, if a root designation datum "tny [+]" (0) corresponding to note degree of a tonic note is outputted from the root designation datum generating circuit 11, the value of the root datum $D_{root}$ which is outputted from the adder circuit 9 will assume a numerical value (8). Here, as shown in FIG. 1, among those keys constituting the keyboard 1, the numerical value (8) corresponds to $C_3$ note which is the tonic note in key of C.

Also, in the state wherein, for example, a tonality datum $D_{tny}$ (3) corresponding to key of G is outputted from the tonality datum generating circuit 8, if a root designation datum "tny [+]" (7) corresponding to note degree of a dominant note is outputted from the root designation datum generating circuit 11, the value of the root datum $D_{root}$ which is outputted from the adder circuit 9 will assume a numerical value (10). Here, as shown in FIG. 1, the numerical value (10) on the keyboard 1 will become D$_3$ which is a dominant note in key of G.

As stated above, the value of the root datum D$_{root}$ which is outputted from the adder circuit 9 will always become a numerical datum corresponding to either one of the tonic note, subdominant note and dominant note in a tonality selected by one of the tonality selection keys 3a, 3b and 3c.

Then, the root datum D$_{root}$ which is outputted from the adder circuit 9 is branched into three note lines, i.e. the root note line, the second location note line and the third location note line. The second location note line and the third location note line are supplied in parallel to the input terminals A of the adder circuits 13 and 14 shown in FIG. 2B, respectively, which are assigned for forming data for a second location note and a third location note, respectively.

To the input terminal B of an adder circuit 13 is supplied a numerical datum (hereinafter to be referred to as "root [+3]") for causing the root note to ascend by a 3rd interval. Also, an input terminal B of the adder circuit 14 is provided with a numerical data (hereinafter to be referred to as "root [+5]") for causing the root note to ascend by a 5th interval. Here, the value of the root ascension datum "root [+3]" is set at a value (4), and the value of the root ascension datum "root [+5]" is set at a value (7).

And, from the adder circuit 13 is outputted a numerical datum (hereinafter to be referred to as a second location note datum D$_{sec}$) corresponding to the result of addition of a root datum D$_{root}$ and a root ascension datum "root [+3]". Also, the adder circuit 14 outputs a numerical datum (hereinafter to be referred to as a third location note datum D$_{thi}$) corresponding to the result of addition of a root datum D$_{root}$ and a root ascension datum "root [+5]". Here, the relationship between the root note datum D$_{root}$, the second location note datum D$_{sec}$ and the third location note datum D$_{thi}$ is shown in FIG. 5 for the respective root note degrees in respective tonalities.

As shown in FIG. 5, if, for example, a root note datum D$_{root}$ (8) corresponding to C$_3$ note which is the tonic note in C tonality is outputted from the adder circuit 9, the adder circuit 13 conducts the operation:

$$D_{root}(8) + root\ [+3](4) = D_{sec}(12).$$

Also, the adder circuit 14 conducts the operation:

$$D_{root}(8) + root\ [+5](7) = D_{thi}(15).$$

As a result, the value of the second location note datum D$_{sec}$ which is outputted from the adder circuit 13 becomes a numerical value (12), and also the value of the third location note datum D$_{thi}$ which is outputted from the adder circuit 14 becomes a numerical value (15).

Here, the numerical value (12) among the respective keys 1a which constitute the keyboard 1 shown in FIG. 1 corresponds to E$_3$ note whereas the numerical value (15) corresponds to G$_3$ note, and these values (12) and (15) respectively are the second location note and the third location note of the tonic chord of C tonality.

Also, if, for example, there is outputted from the adder circuit 9 a root note datum D$_{root}$ (6) which corresponds to A$^\#_2$ note which is a subdominant note in F tonality, the adder circuit 13 conducts the operation:

$$D_{root}(6) + root\ [+3](4) = D_{sec}(10).$$

Also, the adder circuit 14 conducts the operation:

$$D_{root}(6) + root\ [+5](7) = D_{thi}(13).$$

As a result, the value of the second location note datum D$_{sec}$ which is outputted from the adder circuit 13 becomes a numerical value (10). In the same way, the value of the third location note datum D$_{thi}$ which is outputted from the adder circuit 14 becomes a numerical value (13).

Here, among the keys 1a which constitute the keyboard 1 shown in FIG. 1, the numerical value (10) corresponds to D$_3$ note which is the second location note of the subdominant chord in F tonality. Also, the numerical value (13) corresponds to F$_3$ note which is the third location note of the subdominant chord in F tonality.

As stated above, the value of the second location note datum D$_{sec}$ which is outputted from the adder circuit 13 will always correspond to the second location note of any chord among the tonic chord, the subdominant chord and the dominant chord in the designated tonality. Also, the value of the third location note datum D$_{thi}$ which is outputted from the adder circuit 14 will always correspond to the third location note of any chord among the tonic chord, the subdominant chord and the dominant chord in the designated tonality.

Thus, from the adder circuit 9, the adder circuit 13 and the adder circuit 14, there are outputted a root note datum D$_{root}$, a second location note datum D$_{sec}$ and a third location note datum D$_{thi}$ in the note location order at the root position of the chord for constituting any of the tonic chord, the subdominant chord and the dominant chord in the designated tonality, respectively.

Then, the root note datum D$_{root}$ which is outputted from the adder circuit 9 is supplied to an input terminal A of an adder circuit 15 assigned for octave ascension. Also, the second location note datum D$_{sec}$ which is outputted from the adder circuit 13 is supplied to an input terminal A of an adder circuit 16 assigned for octave ascension.

The adder circuit 15 is intended for use in causing a root note to ascend one octave for forming a first inversion chord or a second inversion chord based on the root position chord stated above. Also, the adder circuit 16 is used for effecting one octave ascension of the second location note for forming a second inversion chord based on the root position in the same manner as stated just above. And, the adding actions of these adder circuits 15 and 16 are controlled by a root note inverting datum "root [+]" and a second location note inverting datum "sec [+]" which are outputted from an inversion control datum generating circuit 17.

The inversion datum generating circuit 17 is assigned to control the inversion datum generator whether to output a datum for a root position chord as it is, or to output a datum for a first inversion chord or to output a datum for a second inversion chord based on the abovesaid root position chord datum. More specifically, this inversion datum generating circuit 17 is comprised of a latch circuit for latching, in synchronism with said latch signal S$_{latch}$, a random numerical datum D$_{rdm}'$, outputted from a random number generator 18, and of a numeral datum generating circuit which, in response to the output of this latch circuit, generates three numerical data, i.e. a root note inversion datum "root [+]", a second location note inversion datum "sec [+]" and a third location note inversion datum "thi [+]".

Here, in case a root position chord is to be formed, the values of the respective data "root [+]", "sec [+]" and "thi [+]", will become (0), (0) and (0), respectively. Also, in case a first inversion chord is to be formed, the values of the respective data "root [+]", "sec [+]" and "thi [+]" will become (12), (0) and (0), respectively. Furthermore, in case a second inversion chord is to be formed, the values of the respective data "root [+]", "sec [+]" and "thi [+]" will become (12), (12) and (0), respectively.

And, the root note inversion datum "root [+]" is supplied to the input terminal B of the adder circuit 15, and the second note inversion datum "sec [+]" is supplied to an input terminal B of the adder circuit 16.

As a result, from the adder circuit 15 is outputted a numerical datum (hereinafter to be referred to as an octave root note datum $D_{root}'$) which corresponds to the result of addition of the root note datum $D_{root}$ and the root note inversion datum "root [+]". Also, from the adder circuit 16 is outputted a numerical datum (hereinafter to be referred to as an octave second location note datum $D_{sec}'$) which corresponds to the result of addition of the second location note datum $D_{sec}$ and the second location note inversion datum "sec [+]". More particularly, from the adder circuits 15, 16 and 14, there will be outputted, in the corresponding note location order, the respective note data which constitute either one of the root position chord, the first inversion chord and the second inversion chord in accordance with the values of the respective data "root [+]" and "sec [+]" which are outputted from said inversion control datum generating circuit 17.

Here, the relationship between the respective root position chords and first inversion chords and second inversion chords is shown in FIG. 6 with respect to the respective chord degrees in the respective tonalities. As shown therein, in the state that, for example, a root note datum $D_{root}$ (8) corresponding to the root note of the tonic chord in C is supplied to the input terminal A of the adder circuit 15, and that a second location note datum $D_{sec}$ (12) corresponding to the second location note of the tonic chord in C is supplied to the input terminal A of the adder circuit 16, if a root note inversion datum "root [+]" (0) and a second location note inversion datum "sec [+]" (10) are outputted from the inversion control datum generating circuit 17 in correspondence to the root position, there is performed an operation in the adder circuit 15:

$$D_{root}(8) + root\ [+](0) = D_{root}'(8)$$

Also, in the adder circuit 16, there is performed the following operation:

$$D_{sec}(12) + sec\ [+](0) = D_{sec}'(12)$$

As a result, the note data which constitute an inversion chord will become $D_{root}'$ (8), $D_{sec}'$ (12) and $D_{thi}$ (15) as reckoned from the lowest upwards. This will become exactly the root position chord itself, and no inverting action is carried out.

In contrast thereto, in the state in which, likewise, note data for a tonic chord in C is inputted as a root position chord data, if a root note inversion datum "root [+]" (12) and a second location note inversion datum "sec [+]" (0) are outputted for the first inversion from the inversion control datum generating circuit 17, there will be conducted in the adder circuit 15 an operation:

$$D_{root}(8) + root\ [+](12) = D_{root}'(20).$$

Also, in the adder circuit 16, there is conducted the operation:

$$D_{sec}(12) + sec\ [+](0) = D_{sec}'(12).$$

As a result, the respective note data which constitute an inversion chord will become $D_{sec}'$ (12), $D_{thi}$ (15) and $D_{root}'$ (20) as reckoned from the lowest upwards. This constitutes the first inversion chord which is obtained by subjecting the tonic chord in C to a first inversion.

Furthermore, in the state that, likewise, note data for a tonic chord in C is supplied as a root position chord data, if a root note inversion datum "root [+]" (12) and a second location note inversion datum "sec [+]" (12) are outputted from the inversion control datum generating circuit 17 for the second inversion, there will be conducted the following operation in the adder circuit 15:

$$D_{root}(8) + root\ [+](12) = D_{root}'(20).$$

Also, in the adder circuit 16 is conducted the following operation:

$$D_{sec}(12) + sec\ [+](12) = D_{sec}'(24).$$

As a result, the values of the respective note data which constitute the inversion chord will become $D_{thi}$ (15), $D_{root}'$ (20) and $D_{sec}'$ (24) in the order as reckoned from the lowest upwards. This constitutes the second inversion chord obtained by subjecting the tonic chord in C to the second inversion.

As discussed above, the content of the chord which is constituted by the respective output data $D_{root}'$, $D_{sec}'$ and $D_{thi}$ from the adder circuits 15, 16 and 14 will assume values representing notes for the tonic chord, subdominant chord and dominant chord in a designated tonality in the form of root position, first inversion and second inversion as further modified in accordance with the values of the respective data "root [+]" and "sec [+]" which are outputted from the inversion control datum generating circuit 17. These values will be outputted irregularly in accordance with the content of the random numerical data $D_{rdm}'$ which is outputted from the random number generator 18.

Then, the respective note data $D_{root}'$, $D_{sec}'$, and $D_{thi}$ which jointly constitute an inversion chord datum are supplied to input terminals A of adder circuits 19, 20 and 21 which are intended for shifting down the octave, respectively.

These adder circuits 19, 20 and 21 are intended to serve the following assignments, i.e. in case a root position chord datum is subjected to a first inversion datum or a second inversion datum in such manner as stated above, these adder circuits will prevent the occurrence of such fact that the keys corresponding to the note data which constitute the respective chords fall in the treble region beyond the upper limit of the keyboard of FIG. 1, and the occurrence of such a mishap that the question chord becomes readily known to the pupil by dint of the note heights. The adding actions done in these adder circuits are controlled by a multiplexer 22, a comparator circuit 23 and a subtraction datum generating circuit 24.

The multiplexer 22 is intended to derive always, in selective fashion, a note datum corresponding to the lowest pitch among the inversion datum, and to supply it to an input terminal B of the comparator circuit 23. This selecting action is controlled by a root note inversion datum "root [+]" and a second location note inversion datum "sec [+]" which are outputted from the inversion control datum generating circuit 17.

For example, as shown in FIG. 6, let us take up a dominant chord in G as a root position chord. The note data constituting this dominant chord will be $D_{root}$ (10), $D_{sec}$ (14) and $D_{thi}$ (17) In this instance, if the content of the inversion chord is the root position chord itself the input terminal A of the multiplexer 22 will be selected.

When the input terminal A is selected on the multiplexer 22, there is supplied to the input terminal B of the comparator circuit 23 a note datum $D_{root}'$ (10) corresponding to the lowest note of the inversion chord. Also, to the input terminal A of the comparator circuit 23 is supplied a numerical datum "OCT [+]" corresponding to one octave. As a result, in the comparator circuit 23, there is conducted a comparison of largeness between "OCT [+]" (12) and $D_{root}'$ (10). As a result, $S_{dec}$ "0" is outputted at the output terminal "B>A". And, in response to this "0" output, a subtraction datum generating circuit 24 is so driven that a subtraction datum $D_{dec}$ (0) is supplied in parallel to the input terminals of the adder circuits 19, 20 and 21, respectively.

Next, in the respective adder circuits 19, 20 and 21, there are conducted the following operations, respectively:

$D_{root}'$ (10)+$D_{dec}$ (0)=$D_{root}''$(10), $D_{sec}'$ (14)+$D_{dec}$ (0)=$D_{sec}''$ (14), and $D_{thi}$ (17)+$D_{dec}$ (0)=$D_{thi}'$ (17).

The content of the final question chord data $D_{code}$ will become the root position chord itself not having been given an octave shifting down process at all. In other words, so long as the lowest note of the chord in any inversion (including root position) is not above $E_3$, the chord is presented, as it is, as a question chord.

Similarly, let us now take up the instance of a dominant chord in G. In case the content of the inversion chord datum is of the first inversion chord, the input terminal B of the multiplexer 22 is selected, as $D_{sec}'$ is the lowest.

When the input terminal B is selected on the multiplexer 22, a datum $D_{sec}'$ corresponding to the lowest note of the first inversion chord is supplied to the input terminal B of the comparator circuit 23. And, within this comparator circuit 23, a comparison of largeness between "OCT [+]" (12) and $D_{sec}'$ (14) is conducted, and the B>A output $S_{dec}$ will become "1".

When the B>A output of the comparator circuit 23 becomes "1", the subtraction datum generating circuit 24 is driven by this "1" output. Whereby, a subtraction datum $D_{dec}$ (−12) is supplied in parallel to the input terminals B of the adder circuits 19, 20 and 21, respectively.

As a result, in the respective adder circuits, there are performed the following operations:

$D_{root}'$ (22)+$D_{dec}$ (−12)=$D_{root}''$(10), $D_{sec}'$ (14)+$D_{dec}$ (−12)=$D_{sec}''$ (2), and $D_{thi}$ (17)+$D_{dec}$ (−12)=$D_{thi}'$ (5).

The content of the final question chord datum $D_{code}$ becomes values obtained by subjecting a chord datum of a dominant chord in G to a first inversion, and furthermore to shifting down by one octave as shown by the arrow in FIG. 6. In short, in case the content of the inversion chord is the first inversion chord and its lowest note exceeds $E_3$, the values of the respective constituting notes are subjected to the process of shifting down by one octave, respectively.

Also, in the same way, let us take up here the instance of a dominant chord in G. In case the content of the inversion chord datum is of a second inversion chord, an input terminal C is selected on the multiplexer 22, as $D_{thi}$ is the lowest.

When the input terminal C is selected on the multiplexer 22, a datum $D_{thi}$ (17) which corresponds to the lowest note of the second inversion chord is supplied to the input terminal B of the comparator 23. For this reason, in the comparator circuit 23, a comparison of largeness between "OCT [+]" (12) and $D_{thi}$ (17) is performed, and the content of the B>A output becomes "1".

As a result, in the same way as that for the abovesaid first inversion chord, the respective constituent notes are subjected to a process of shifting down by one octave. And, the content of the final question chord datum $D_{code}$ will take the values obtained by subjecting a chord datum of the dominant chord in G to a second inversion, and further to shifting down by one octave.

As stated above, the content of the final question chord datum $D_{code}$ is determined in accordance with the content concerning the selection of the tonality selection switches $SW_2 \sim SW_4$, the content of the random numerical datum $D_{rdm}$ outputted from the random number generator 12, and the content of the respective inversion data "root [+]", and "sec [+]" which are outputted from the inversion control datum generating circuit 17 and the lowest note of the inversion chord. Whereby, the content of the final question chord datum $D_{code}$ will have values resulted by first obtaining a chord datum of any of a tonic chord, a subdominant chord and a dominant chord in the designated tonality in any of a root position, a first inversion and a second inversion, and further by subjecting them to an octave shifting down process as required Then, the final question chord datum $D_{code}$ is converted to musical tone signals of the intended chord via a musical tone forming circuit 25, and these musical tone signals $S_{music}$ are supplied, via the sounding system changeover switch $SW_5$, selectively to either a headphone 26 or to an amplifier 27.

Accordingly, musical tones corresponding to the question chord are sounded from either the headphone 26 or the loudspeaker 7. Based on these musical sounds which are pronounced, the student or the pupil is able to recognize the question chord presented. And, by switching, at such time, the connection of the changeover switch $SW_5$ over to the headphone side, it becomes possible for a large number of pupils or students to perform a sound dictation training based on different chords at the same time in a same classroom. Thus, it is possible also to enhance the effect of group study for a sound dictation training of this type.

Also, the final question chord datum $D_{code}$ is supplied also to the input terminal A of a coincidence judgment circuit 27, and is further supplied to an input terminal A of an adder circuit 28.

The coincidence judgment circuit 27 is intended to judge the coincidence between the question chord and the chord constituted by the depressed keys on the keyboard. To the input terminal B of this circuit 27 are supplied numerical data (hereinafter to be collectively referred to as a depressed chord datum $D_{code(push)}$) which corresponds to the depressed chord on the keyboard 1. And, when there is a perfect coincidence between the chord by the keys depressed on the keyboard and the content of the question chord, the EQ output of the coincidence judgment circuit 27 becomes "1", and this coincidence signal $S_{eql}$ is supplied to the control circuit 10, and concurrently therewith a key-on signal $S_{kon}$ which is outputted from the keyboard 1 also is supplied to the control circuit 10.

Next, description will be made, by referring to FIG. 3, of the circuitry operation done by the controlling circuit 10 in association with the operation for causing repetition of the chord question presenting action described above and also with the operation for a display on the indicator 2 by changing over the indication between the correct answer chord and the gained points corresponding to the result of points calculation.

In FIG. 3, when the start switch $SW_1$ is turned "on", its output "1" is supplied, via an OR circuit 101 and a delay circuit 102, to a set input S of an RS flip-flop 103, and its Q output is set to "1". When the Q output of the RS flip-flop 103 is set to "1", AND circuits 104 and 105 are relieved of their inhibition state in response thereto.

Also, in the keyboard 1, when any key is depressed, a key-on signal $S_{kon}$ will rise from "0" to "1" in response to the timing of the depression of this key. In synchronism with this rise, a "1" pulse of a narrow width is outputted from a rise differentiation circuit 106.

Here, when there occurs a coincidence between the depressed chord and the question chord, a predetermined logic condition is established on the input side of an AND circuit 105, and a "1" pulse is outputted from the AND circuit 105.

And, the "1" pulse which is outputted from this AND circuit 105 is supplied to a points calculating circuit 107.

The points calculating circuit 107 is intended to output a numerical datum (hereinafter to be referred to as a score datum $D_{score}$) which corresponds to either the number of correct answers or the ratio of correct answers, when answers are made for the question chords presented. Also, when the points become m or more, a score-over signal $S_{over}$ is outputted from the points calculating circuit 107.

And, said score datum $D_{score}$ is supplied to the input terminal B of the selection circuit 29 shown in FIG. 2C.

On the other hand, the "1" pulse which is outputted from the AND circuit 105 is supplied, via an OR circuit 108, to the reset input of a scale-of-n counter 109 and resets this counter. Concurrently therewith, this "1" pulse is supplied also to the reset input R of an RS flip-flop 110 and resets its Q output to "0". The Q output of this RS flip-flop 110 (hereinafter this Q output is referred to as a selection control signal $S_{cos}$) is supplied to the selection input SA of the selection circuit 29.

Figure 8:
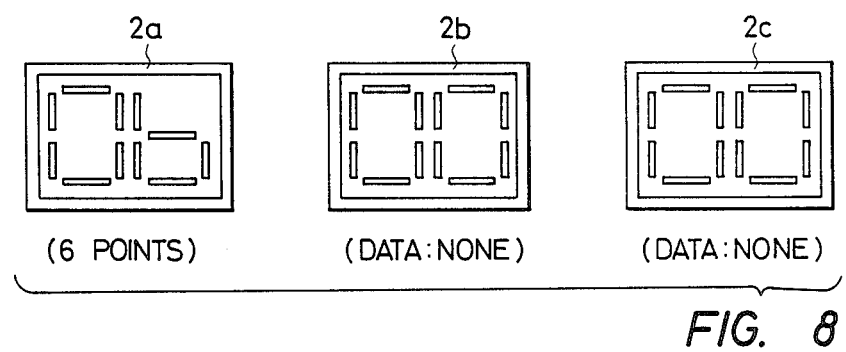
FIG. 8 shows the state of the three numerical value indicators on which is displayed the gained points.

As a result, in the selection circuit 29, its input terminal B is selected in response to the selection control signal $S_{cos}$ "0", and accordingly said score datum $D_{score}$ is supplied, via the input terminal B of the selection circuit 29, to the display 2. And, as shown in FIG. 8, a numerical value of one digit corresponding to the gained points will be displayed on the numerical value display window which constitutes the display 2. In this Figure, the numerals "0" should preferably be suppressed (erased) for easier grasp. When a value of two or three digits should be necessary to exhibit the points, two or three windows have only to be utilized with one digit per window.

Also, when a "1" pulse is outputted from the AND circuit 105 in association with the fact that there is established a coincidence between the depressed chord and the question chord presented, this "1" pulse is supplied to the OR circuit 101 via the OR circuit 111 and the delay circuit 112. As a result, upon establishment of coincidence between the depressed chord and the question chord, a latch signal $S_{latch}$ is outputted again from the OR circuit 101. Based on this latch signal $S_{latch}$, the above-stated chord question presenting operation is resumed.

In contrast thereto, in case there is not established a coincidence between the depressed chord and the question chord presented, there is established a predetermined logic condition on the input side of the AND circuit 104, and accordingly the count value of the n-ary counter 109 will advance one for each chord depression on the keyboard. And, when its count value reaches a predetermined count completion value N, the Q output of said RS flip-flop 110 is set to "1" by the carryout output of the counter.

In this way, when the content of the selection control signal $S_{cos}$ turns to "1", an input terminal A is selected on the selection circuit 29 shown in FIG. 2C, and a display corresponding to a display chord datum $D_{code(dpy)}$ which is outputted from the adder circuit 28 is conducted on the display 2.

Here, the adder circuit 28 is so arranged as to perform selective adding action in accordance with the content of the selection control signal $S_{cos}$, so as to be operative that, only for the condition "1" of the content of the selection control signal $S_{cos}$, it adds up the numerical value (9) to each question chord datum $D_{code}$.

Figure 7:
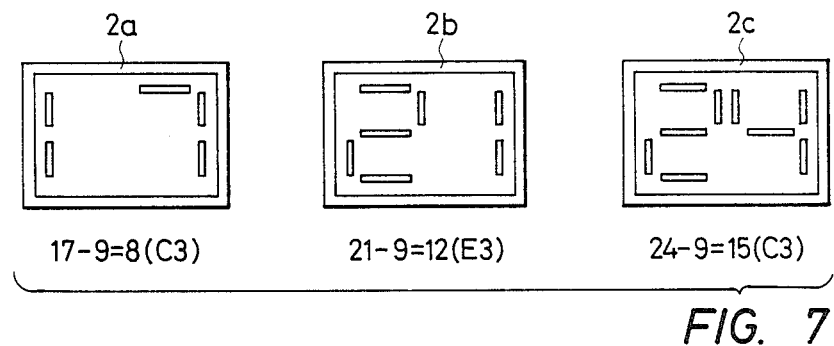
FIG. 7 shows the state of the three numerical value indicators in which the numerical values are displayed corresponding to the depressed keys on the keyboard constituting the correct answer chord.

As a result, if the state of no coincidence continues to appear over a predetermined number during the course of repetition of chord depression on the keyboard 1 in correspondence with the presented question chord, numerical values indicative of the three notes corresponding to the correct answer chord are displayed, as shown in FIG. 7, on the respective numerical value displays 2a, 2b and 2c which jointly constitute the display 2.

Here, the numerical values displayed on the respective numerical value displays 2a, 2b and 2c assume the values which are obtained by the addition +9 to the numbers of the respective corresponding keys on the keyboard 1 shown in FIG. 1.

As a result, even when the key corresponding to a numeral (1), i.e. $F_2$ note, is displayed, the numerical value which is displayed on any one of the numerical value displays 2a, 2b and 2c will be:

(1)+(9)=(10), and thus the numerical values which are displayed will invariably be numerical values of two digits in a window. And, as stated earlier, it is possible to prevent any erroneous recognition of the display, as distinguished from the instance that a gained score is displayed. Also, according to this datum, it is also possible to perform a display, on the display window, of the note name with an alphabetical letter by encoding the datum into the letter.

On the other hand, when a carryout output is generated from the n-ary counter as stated above, this carryout output is supplied to the input side of the OR circuit 101 via the OR circuit 111 and the delay circuit 112. As a result, in case no correct answer is obtained for key depressions of n times or more as stated earlier, a latch signal $S_{latch}$ is outputted again, and a fresh different chord question is presented.

When the gained points calculated on the points calculating circuit 107 reaches m points or more during the course of repetition of the above-stated operation, a score-over signal $S_{over}$ "1" is outputted. This score-over signal $S_{over}$ is supplied to the reset input R of the RS flip-flop 103 via an OR circuit 113, and its Q output is reset to "0". As a result, the AND circuits 104 and 105 are again disabled, and thus the question presenting and answering operation will terminate.

Thus, according to the musical quiz apparatus shown in this embodiment, the power supply key 5 shown in FIG. 1 is operated, and then either one of the tonality selection keys $3a \sim 3c$ is operated to set the tonality of the question chord, and then the start key 4 is operated. Whereupon, in accordance with the changeover set state of the sounding system changeover switch 6, musical sounds corresponding to a certain chord are sounded through the loudspeaker or through the headphone. By changing over the connection of the sounding system changeover switch 6 to be set to the headphone side, it is possible to simultaneously present different chords to a plurality of pupils, respectively, in a same classroom.

Then, by operating either ones of the keys $1a$ on the keyboard 1 simultaneously in correspondence to the musical sounds presented as a question, there is displayed on the numerical value indicator $2a$ a gained points corresponding to the result of the gained points as shown in FIG. 8 only when there is a coincidence between the answer chord depressed and the question chord presented. On the other hand, in case there are not performed key depressions corresponding to the correct answer in excess of a predetermined number of times of key depressions for the presented question chord, there will be displayed on the respective numerical value displays $2a \sim 2c$ the numerical values corresponding to the respective note data which constitute the correct answer chord, as shown in FIG. 7. Also, the numerical data which are displayed at such time will assume a value which is added by $+9$ to the numerical values of the correct keys on the keyboard 1. Thus, as will be clear from the comparison between FIG. 7 and FIG. 8, a numerical value consisting of two digits will be viewed invariably when a correct answer chord is displayed. In contrast thereto, when the gained points are to be displayed, the numerical value will always be comprised by one digit per window. Whereby, misreading of the display between the correct answer chord and the gained points can be unfailingly prevented.

Also, in this embodiment, the pupil himself is able to select the tonality of the question chord which is presented, by operating either one of the tonality selection keys $3a \sim 3c$. Accordingly, as in the case of performing a study of harmonies, the apparatus is very suitable for the exercise of recognizing chords in each tonality.

Furthermore, in this embodiment, arrangement is provided to allow a manual setting with respect only to tonality as stated earlier. However, this apparatus is constructed so that, with respect to the kinds of chords in a certain tonality, they can be set randomly based on the random numerical data $D_{rdm}$ and $D_{rdm}'$ which are outputted from the random number generators 12 and 18, respectively. Accordingly, it becomes possible also to prevent a lowering of the effect of training due to such cause as memorizing, on the part of the pupil, the tendency of the question chords to be presented, as has been so with conventional apparatuses of this type designed for presenting question chords.

Also, in this embodiment, arrangement is provided so that, with respect to the tonality of a chord, its designation can be made manually, but that with respect to the selection of tonic chord, subdominant chord and dominant chord in the designated tonality, their random selection can be made based on a random numerical datum $D_{rdm}$ which is outputted from the random number generator 12, and furthermore, arrangement is provided so that, with respect to the root position, first inversion and second inversion of the respective chords, a random selection can be made based on a random numerical value $D_{rdm}'$ which is outputted from the random number generator 18. Accordingly, the kind of the chord presented as a question will be either one of the root position, first inversion and second inversion of the tonic chord, subdominant chord and dominant chord in the designated tonality. Thus, it is possible to greatly enrich the number of kinds, i.e. variation, of the chords which are to be presented as questions.

Also, in this embodiment, arrangement is provided so that the lowest notes of the chords after respective inversions are detected, and that in case these notes are above $E_3$ note, the respective constituent notes of the chords are lowered uniformly by one octave. Thus, the respective keys constituting the question chord presented will exist within substantially a same narrow range of zone on the keyboard 1 shown in FIG. 1. Whereby, the musical sounds corresponding to the chord which is to be presented as a question will sometime be high and some other time low in the note pitch. Thus, it is also possible to prevent beforehand the fear that the inversions of the question chord which are presented would otherwise be anticipated by the pupil.

Description has been made above of the embodiment in which the tonality of the question chord which is presented is set manually. However, by arranging so that the selection of the tonality datum $D_{tny}$ also can be made separately by an output of the random number generator 12 as shown by a broken line connection from block 12 to block 8 in FIG. 2A, it is of course possible to present further richer variation of chords. Also, by arranging so that a root position chord is supplied directly to the musical sound forming circuit 25, the coincidence judgment circuit 27 and the adder circuit 28 as required, it is possible to construct an apparatus for beginners. Furthermore, in this embodiment, the apparatus is constructed as a musical quiz apparatus having the exclusive function of providing sound dictation training. Therefore, this apparatus is not equipped with a musical sound generating system for the keyboard 1. However, by arranging so that the datum $D_{code(push)}$ outputted from the keyboard 1 is supplied to a separately provided musical sound forming circuit, so that changeover can be made by a changeover switch between the function as a training means and the function as an ordinary electronic musical instrument, it is needless to say that this apparatus can also have the function as an independent ordinary electronic musical instrument.

What is claimed is:

1. A musical quiz apparatus for presenting audible question chords and for answering such questions, comprising:
   chord datum generating means capable of generating a plurality of kinds of different chord data respectively representing chords and generating a question chord datum one at a time as randomly selected from among said plural kinds of chord data, wherein said plural kinds of chords data contain data of a tonic chord, a subdominant chord and a dominant chord in each of a plurality of tonalities, and said chord datum generating means comprises:
   tonality selecting means for selecting one of a plurality of tonalities;
   tonality datum generating means connected to said tonality selecting means for generating a tonality datum indicative of the totality selected by said tonality selecting means;
   root note designation datum generating means for randomly generating a numerical datum corresponding to either one of a tonic note, a subdominant not and a dominant note; and
   root note datum generating means for receiving said tonality datum and said numerical datum for generating a root not datum indicative of a root note of either one of the tonic chord, subdominant chord and dominant chord in said selected tonality, whereby generating, based on said root note, said question chord data indicative of a root position of either one of the tonic chord, subdominant chord and dominant chord in said selected tonality;
   musical tone forming means supplied with said question chord datum for forming audible musical tones constituting a chord designated by said question chord datum;
   musical keyboard means including keys respectively representing musical notes and capable of being depressed;
   depressed chord detecting means coupled with said keyboard means for producing a depressed chord datum indicative of a chord constituted by keys depressed after formation of said audible musical tones constituting a chord;
   judging means supplied with said question chord datum and said depressed chord datum for producing a coincidence output when said question chord datum coincides with said depressed chord datum; and
   control means connected to said judging means and to said chord datum generating means for controlling said chord datum generating means to generate a next question chord datum upon receipt of said coincidence output.

2. A musical quiz apparatus for presenting audible question chords and for answering such questions, comprising:
   chord datum generating means capable of generating a plurality of kinds of different chord data respectively representing chords and generating a question chord datum one at a time as randomly selected from among said plural kinds of chord data, said plural kinds of chord data contain data of a tonic chord, a subdominant chord and a dominant chord in at least one tonality, and data of chords in a root position and inversions for each said tonic chord, subdominant chord and dominant chord in at least one tonality, wherein each chord datum is comprised of note data representing respective notes which constitute each said chord and in which said chord datum generating means comprises:
   root position datum generating means for generating a root position chord datum indicative of a chord in the root position of either one of a tonic chord, a subdominant chord and a dominant chord;
   inversion control datum generating means for randomly generating one of a plural kinds of control data used to selectively effect a modification of said root position chord datum into an inversion chord datum which represents the chord in its inversion; and
   inversion datum generating means for receiving said root position chord datum and said control datum, and for generating said root position chord datum per se or said inversion chord datum based on said control datum to serve as said question chord datum;
   musical tone forming means supplied with said question chord datum for forming audible musical tones constituting a chord designated by said question chord datum;
   musical keyboard means including keys respectively representing musical notes and capable of being depressed;
   depressed chord detecting means coupled with said keyboard means for producing a depressed chord datum indicative of a chord constituted by keys depressed after formation of said audible musical tones constituting a chord;
   judging means supplied with said question chord datum and said depressed chord datum for producing a coincidence output when said question chord datum coincides with said depressed chord datum; and
   control means connected to said judging means and to said chord datum generating means for controlling said chord datum generating means to generate a next question chord datum upon receipt of said coincidence output.

3. A musical quiz apparatus according to claim 2, further comprising:
   octave shifting means for receiving said root position chord datum or said invention chord datum, and for shifting each note datum in said chord datum by an octave when any note datum represents a note outside of a predetermined note pitch range, and for generating the resulting chord datum as the question chord datum.

4. A musical quiz apparatus for presenting audible question chords and for answering such questions, comprising:
   chord datum generating means capable of generating a plurality of kinds of different chord data respectively representing chords and generating a question chord datum one at a time as randomly selected from among said plural kinds of chord data;
   musical tone forming means supplied with said question chord datum for forming audible musical tones constituting a chord designated by said question chord datum;

musical keyboard means including keys respectively representing musical notes and capable of being depressed;

depressed chord detecting means coupled with said keyboard means for producing a depressed chord datum indicative of a chord constituted by keys depressed after formation of said audible musical tones constituting a chord;

judging means supplied with said question chord datum and said depressed chord datum for producing a coincidence output when said question chord datum coincides with said depressed chord datum;

control means connected to said judging means and to said chord datum generating means for controlling said chord datum generating means to generate a next question chord datum upon receipt of said coincidence output;

points calculating means for receiving said coincidence output to calculate the gained points for a correct answer of a chord datum, and for generating a points result datum indicative of the gained points;

indicating means for receiving said points result datum and indicating the gain points;

non-coincidence counting means coupled to said keyboard means and said judging means to effect counting "one" when no coincidence output is generated when said judging means fails to generate said coincidence output in response to said key depression on the keyboard, and generates a signal when contents of said count exceeds a predetermined value; and indication changeover means for receiving a signal from the non-coincidence calculating means to cause said indicating means to indicate a chord constituted by said question chord date in lieu of the gained points.

* * * * *